United States Patent
Schultz et al.

(10) Patent No.: US 12,153,217 B2
(45) Date of Patent: Nov. 26, 2024

(54) DIGITAL WRITING OF LARGE DIFFRACTION GRATING PATTERNS

(71) Applicant: Vuzix Corporation, West Henrietta, NY (US)

(72) Inventors: Robert J. Schultz, Victor, NY (US); Marek W. Kowarz, Henrietta, NY (US); Robert W. Gray, Rochester, NY (US)

(73) Assignee: Vuzix Corporation, West Henrietta, NY (US)

( * ) Notice: Subject to any disclaimer, the term of this patent is extended or adjusted under 35 U.S.C. 154(b) by 623 days.

(21) Appl. No.: 17/422,960

(22) PCT Filed: Jan. 14, 2020

(86) PCT No.: PCT/US2020/013565
§ 371 (c)(1),
(2) Date: Jul. 14, 2021

(87) PCT Pub. No.: WO2020/150276
PCT Pub. Date: Jul. 23, 2020

(65) Prior Publication Data
US 2022/0075195 A1    Mar. 10, 2022

Related U.S. Application Data

(60) Provisional application No. 62/792,318, filed on Jan. 14, 2019.

(51) Int. Cl.
*G02B 27/01*          (2006.01)
*F21V 8/00*           (2006.01)
(Continued)

(52) U.S. Cl.
CPC ....... *G02B 27/0172* (2013.01); *G02B 5/1852* (2013.01); *G02B 6/0011* (2013.01);
(Continued)

(58) Field of Classification Search
None
See application file for complete search history.

(56) References Cited

U.S. PATENT DOCUMENTS

| | | |
|---|---|---|
| 2010/0039707 A1 | 2/2010 | Akahane et al. |
| 2012/0085894 A1 | 4/2012 | Zhong et al. |

(Continued)

FOREIGN PATENT DOCUMENTS

| | | |
|---|---|---|
| CN | 101308322 A | 11/2008 |
| CN | 101945612 A | 1/2011 |

(Continued)

*Primary Examiner* — Derek S. Chapel
(74) *Attorney, Agent, or Firm* — Harter Secrest & Emery LLP; Jacob D. Merrill, Esq.

(57) ABSTRACT

A method of fabricating a substrate includes providing a substrate having a flat surface and a beam writing system operable to write in a first direction and a second direction, wherein the second direction is perpendicular to the first direction. The method further includes providing a diffraction grating layout pattern having a first diffraction grating, a second diffraction grating, and a third diffraction grating. The method also includes locating the substrate in the beam writing system, whereby the beam writing system is operable to write into the flat surface, and aligning one of the first, second, and third diffraction gratings parallel with the beam writing system first direction. Additionally, the method includes writing the diffraction grating layout pattern into the substrate flat surface via the beam writing machine.

18 Claims, 12 Drawing Sheets

(51) Int. Cl.
  *G02B 5/18*       (2006.01)
  *G02B 6/293*      (2006.01)
(52) U.S. Cl.
  CPC ........ *G02B 6/29304* (2013.01); *G02B 5/1819* (2013.01); *G02B 2027/0178* (2013.01)

(56) References Cited

U.S. PATENT DOCUMENTS

| | | |
|---|---|---|
| 2013/0033752 A1 | 2/2013 | Chen et al. |
| 2015/0168802 A1 | 6/2015 | Bohn |
| 2016/0231566 A1* | 8/2016 | Levola ............... G02B 6/00 |
| 2017/0010488 A1* | 1/2017 | Klug ................ G02B 27/0172 |
| 2017/0322426 A1 | 11/2017 | Tervo |
| 2020/0073030 A1* | 3/2020 | Toyama ............... G02B 5/1866 |
| 2020/0209484 A1* | 7/2020 | Lee ................... G02B 5/1809 |

FOREIGN PATENT DOCUMENTS

| | | |
|---|---|---|
| CN | 102768385 A | 11/2012 |
| CN | 107250880 A | 10/2017 |
| CN | 107797287 A | 3/2018 |
| JP | S62-208001 A | 9/1987 |
| JP | H08-114429 A | 5/1996 |
| JP | H08-213299 A | 8/1996 |
| JP | H09-329705 A | 12/1997 |
| JP | 2000121815 A | 4/2000 |
| JP | 2003173954 A | 6/2003 |
| JP | 2004198641 A | 7/2004 |
| JP | 2008076922 A | 4/2008 |
| JP | 2009065036 A | 3/2009 |
| JP | 2010197436 A | 9/2010 |
| JP | 2012194442 A | 10/2012 |
| JP | 2013157064 A | 8/2013 |
| JP | 2014238465 A | 12/2014 |
| JP | 2015028528 A | 2/2015 |
| WO | 2008056577 A1 | 5/2008 |
| WO | 2009101238 A1 | 8/2009 |
| WO | 2016130342 A1 | 8/2016 |
| WO | 2017120320 A1 | 7/2017 |
| WO | 2018206847 A1 | 11/2018 |
| WO | 2018213009 A1 | 11/2018 |
| WO | 2018231754 A1 | 12/2018 |

* cited by examiner

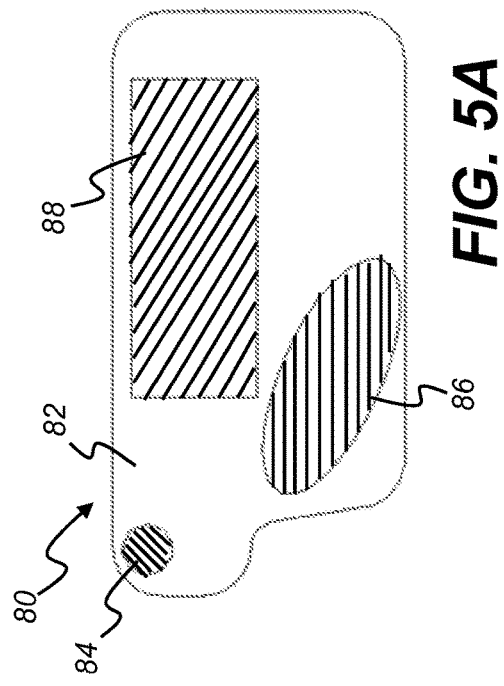
FIG. 5A
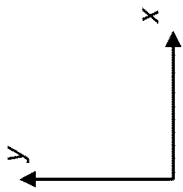
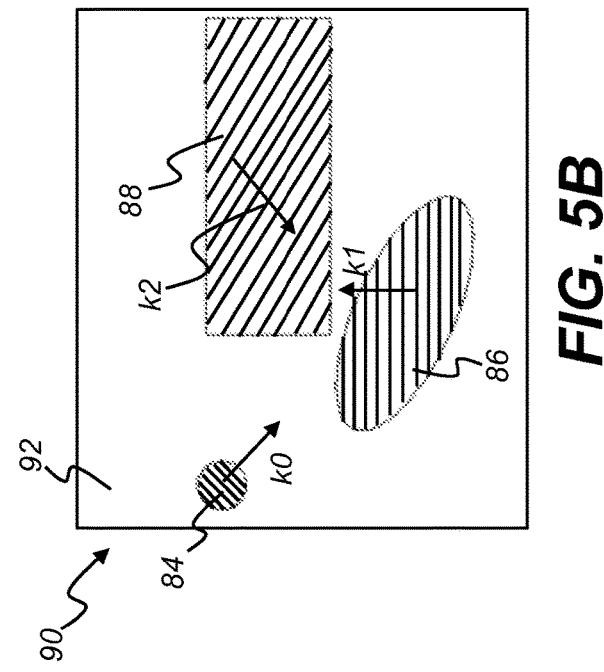
FIG. 5B

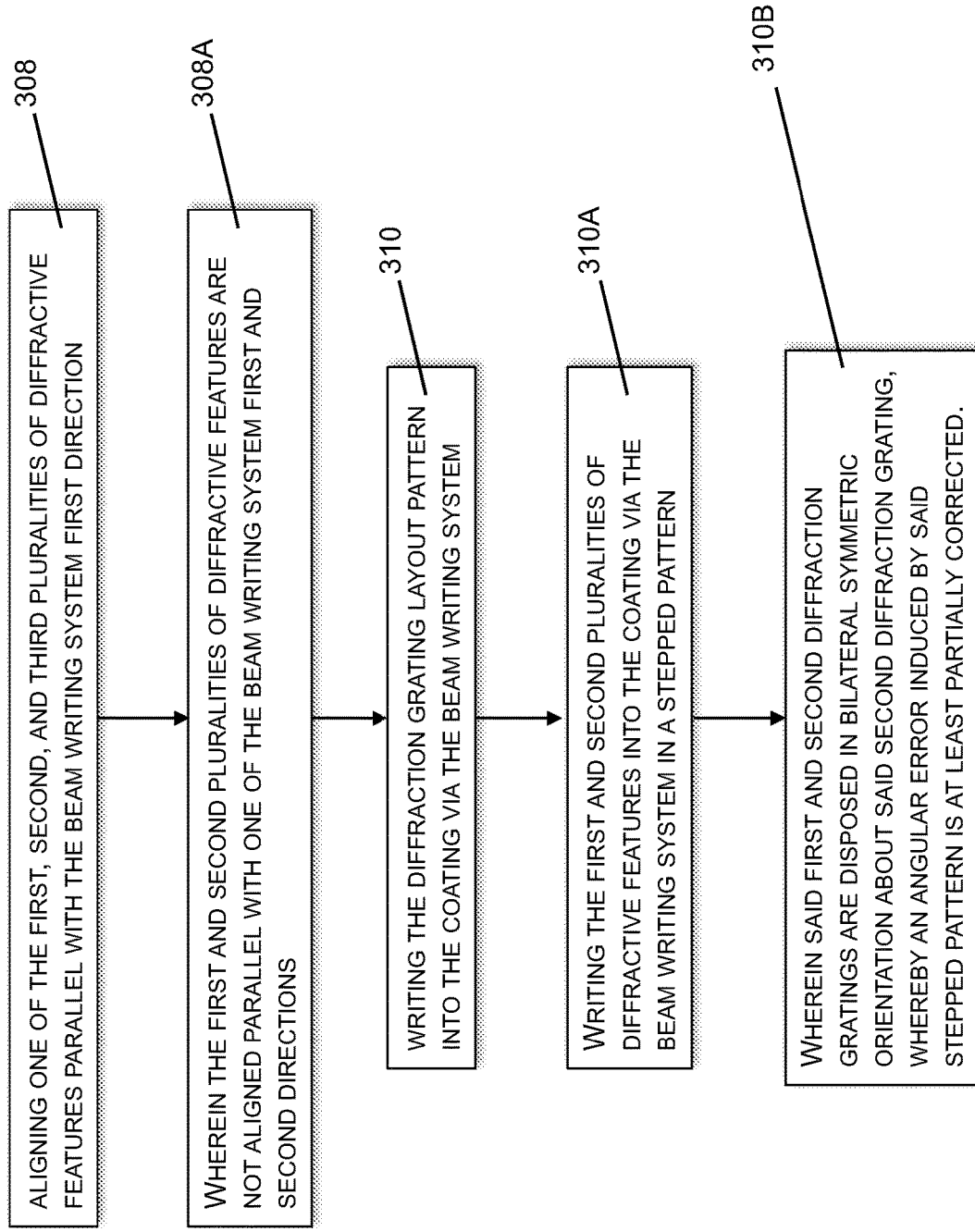

DIGITAL WRITING OF LARGE DIFFRACTION GRATING PATTERNS

TECHNICAL FIELD

The present disclosure relates generally to the fabrication of a diffraction grating pattern in a substrate, and more specifically to the digital production of a diffraction grating pattern in a mold substrate for fabricating optical waveguides utilized in a virtual image near-eye display system.

BACKGROUND

Virtual image near-eye display systems are being developed for a range of diverse uses, including military, commercial, industrial, fire-fighting, and entertainment applications. For many of these applications, there is particular value in forming a virtual image that can be visually superimposed over the real-world image that lies in the field of view of the user. An optical image light guide may convey image bearing light to a user in a narrow space for directing the virtual image to the user's pupil and enabling this superposition function.

Producing an optical image light guide according to conventional designs and methods is time and capital intensive. The present disclosure describes, inter alia, an optical image light guide and a more efficient method of making same.

SUMMARY

The present disclosure provides for a substrate and method of making same. In a first exemplary embodiment, a substrate includes a flat surface having a first diffraction grating, a second diffraction grating, and a third diffraction grating disposed in the flat surface, wherein the first diffraction grating includes a first plurality of diffractive features, the second diffraction grating includes a second plurality of diffractive features, and the third diffraction grating includes a third plurality of diffractive features. One or more of the first, second, and third pluralities of diffractive features comprise a stepped pattern.

In a second exemplary embodiment, a virtual image near-eye display system includes a first planar waveguide having a first, second and third diffraction grating, and a second planar waveguide having a first, second and third diffraction grating, wherein the second planar waveguide is disposed parallel with the first planar waveguide. Each of the first and second planar waveguide diffraction gratings comprises a grating vector, and at least one of the first, second, and third diffraction gratings of each of the first and second planar waveguides includes diffractive features defining a step pattern, and at least one of the first, second, and third diffraction gratings of each of the first and second planar waveguides includes diffractive features defining a straight line.

In a third exemplary embodiment, a method of fabricating a substrate includes providing a substrate having a flat surface, wherein a coating is coupled with the flat surface, and providing a beam writing system operable to write in a first direction and a second direction, wherein the second direction is perpendicular to the first direction. The method further includes providing a diffraction grating layout pattern having a first diffraction grating including a first plurality of diffractive features defining a first grating vector, a second diffraction grating including a second plurality of diffractive features defining a second grating vector, and a third diffraction grating including a third plurality of diffractive features defining a third grating vector. The method also includes locating the substrate in the beam writing system, whereby the beam writing system is operable to write into the coating. Additionally, the method includes aligning one of the first, second, and third pluralities of diffractive features parallel with the beam writing system first direction, and writing the diffraction grating layout pattern into the coating via the beam writing system.

In a fourth exemplary embodiment, a beam writing system includes a first platform operable to translate in an x-axis direction and a y-axis direction, and a second platform operable to rotate about a z-axis perpendicular to the first platform, wherein the second platform is mounted to the first platform. A substrate may be selectively coupled with the second platform whereby a diffractive feature being fabricated in the substrate is always oriented in one of the first platform x-axis and y-axis directions.

BRIEF DESCRIPTION OF THE DRAWINGS

The accompanying drawings are incorporated herein as part of the specification. The drawings described herein illustrate embodiments of the present disclosure and are illustrative of selected principles and teachings thereof. However, the drawings do not illustrate all possible implementations of the presently disclosed subject matter and are not intended to limit the scope of the present disclosure in any way.

FIG. 5A illustrates a schematic of a waveguide having three diffraction gratings according to another embodiment of the present disclosure;

FIG. 5B illustrates a schematic of a substrate depicting an orientation of a diffraction grating according to an embodiment of the present disclosure;

FIG. 12 is a flowchart illustrating a method of fabricating a mold substrate according to another embodiment of the present disclosure.

DETAILED DESCRIPTION

Figure 1:
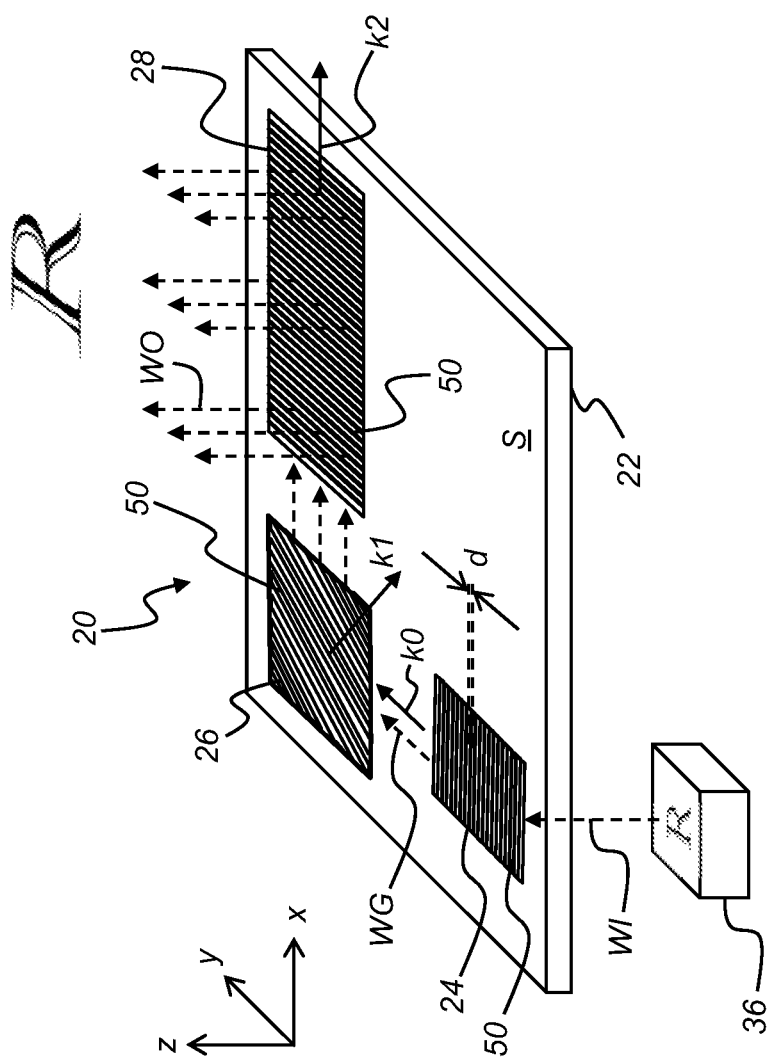
FIG. 1 illustrates a schematic of a waveguide having multiple diffraction gratings according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 2:
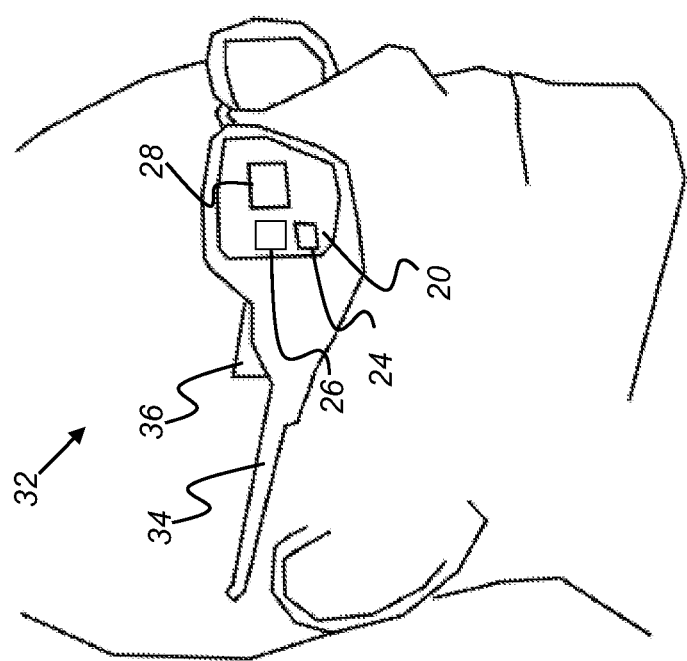
FIG. 2 illustrates a schematic of a person wearing a head mounted display system according to an embodiment of the present disclosure.

As an alternative to real image projection, an optical system may produce a virtual image display. In an embodiment, as illustrated in FIG. 2, the optical system may be, or include, a virtual image near-eye display system 34. The virtual image near-eye display system 34 may comprise a Head-Mounted Display ("HMD"). In contrast to methods for forming a real image, a virtual image is not formed on a display surface. That is, if a display surface were positioned at the perceived location of a virtual image, no image would be formed on that surface. Virtual image display has a number of inherent advantages for augmented reality display. For example, the apparent size of a virtual image is not limited by the size or location of a display surface. In comparison with systems that project a real image, a more realistic viewing experience can be provided by forming a virtual image that appears to be some distance away. Providing a virtual image also obviates any need to compensate for screen artifacts, as may be necessary when projecting a real image.

As illustrated in FIG. 1, an optical imaging light guide 20 may convey image bearing light WO to a user 32. Collimated relatively angularly encoded light beams WI ("image bearing light") from an image source 36 may be coupled into the optical imaging light guide 20 by an input coupling optic 24 which may be mounted or formed in/on a surface of the imaging light guide 20. After propagating along the optical imaging light guide 20, the diffracted light can be directed back out of the optical imaging light guide 20 by an output coupling diffractive optic 28 which may be arranged to provide pupil expansion along one dimension of the virtual image. In addition, a turning diffractive optic 26 may be positioned on/in the optical imaging light guide 20 optically between the input and output coupling optics 24, 28 to provide pupil expansion in an orthogonal dimension to the pupil expansion of the virtual image via the out-coupling diffractive optic 28. In an embodiment, such diffractive optics can be formed as diffraction gratings. For example, a diffraction grating can be formed by surface relief. The image bearing light WO output from the optical imaging light guide 20 provides an expanded eyebox for the viewer.

Referring to FIG. 1, in an embodiment, an optical imaging light guide 20 includes a planar waveguide 22 on which three diffractive optics 24, 26, 28 are fabricated. The imaging light guide 20 is arranged as a beam expander that provides beam expansion with respect to both x- and y-axes using an intermediate turning diffractive optic 26 to redirect the light output (first diffracted mode) from in-coupling diffractive optic 24 to out-coupling diffractive optic 28. The in-coupling diffractive optic 24 having a grating vector k0, may be used to optically couple an image bearing light beam WI from an imaging projector 36 with the planar waveguide 22. The input light beams WI are diffracted by in-coupling diffractive optic 24. For example, first order diffracted light propagates as an angularly related set of beams WG along the substrate S, toward turning diffractive optic 24. Between gratings or other types of diffractive optics, light is channeled or directed along the waveguide 22 by Total Internal Reflection (TIR). Out-coupling diffractive optic 28 contributes to beam expansion via multiple diffractive encounters with the propagating light beams WG along its length, i.e., along the x-axis in the view of FIG. 1, and directs the diffracted light from each encounter outwards towards the intended location of an observer's eye.

A portion of the image bearing light beam WG may be directed toward a intermediate turning diffractive optic 26, having a grating vector k1. The turning diffractive optic 26 may be used to turn/direct at least a portion of the optically coupled image bearing light beam WG propagating through the planar waveguide 22 toward the out-coupling diffractive optic 28 having a grating vector k2. Intermediate grating 26 is termed a "turning grating" because of its function in the optical path, redirecting the beams WG from within the waveguide 22 according to its grating vector k1 in a direction towards the out-coupling diffractive optic 28, thereby accounting for a difference in angle between the grating vectors k0, k2 of the in-coupling diffraction optic 110 and the out-coupling diffraction optic 120. Turning diffractive optic 26, which has angular orientation of diffraction elements and a spacing geometry determined by spacing period d, not only redirects the internally reflected beams WG but also contributes to beam expansion via multiple diffractive encounters with the light beams WG along the initial direction of propagation, i.e., along the y-axis in the view of FIG. 1.

In this way, the turning diffractive optic 26 is positioned optically between the in-coupling diffractive optic 24 and the out-coupling diffractive optic 28. The diffraction gratings 24, 26, 28 include a plurality of diffractive features 50. The diffractive features 50 may be grooves, lines, or rulings. In an embodiment, as illustrated in FIG. 1, the diffractive features 50 may comprise straight lines. Each diffraction grating 24, 26, 28 may have diffractive features 50 of different width, depth, blaze angle, duty cycle, etc. relative to each other diffraction grating 24, 26, 28.

Positioning the turning diffractive optic 26 optically between the input and output coupling diffraction gratings 24, 28 enables the turning diffractive optic 26 to turn/direct at least a portion of the image bearing light propagating through the planar waveguide from the input coupling diffraction grating 24 toward the output coupling diffraction grating 28. Creating at least three diffraction gratings on a photosensitive layer, a mask layer, or a flat surface of a mold substrate may require significant write time of an e-beam or ion-beam and/or other beam writing apparatus. However, as described herein, the diffraction grating pattern write time may be reduced via the orientation of the diffraction gratings with respect to the x- and/or y-axis of the beam writing machine utilized. The x- and/or y-axis of the beam writing machine may be referred to herein as the preferred beam writing directions. The x- and y-axis are the directions in which the beam writing machine can most accurately and/or quickly write a diffractive feature into a mold substrate and/or material layer on a substrate.

In an embodiment, the layout pattern of the diffraction gratings may be directly formed or written onto and/or into a flat surface of a mold substrate using, but not limited to, the methods of electron beam (e-beam) lithography, ion beam lithography, laser lithography, and/or other digital beam writing. In another embodiment, the layout pattern of the diffraction gratings can be written into a mask layer, or a coating, disposed over a mold substrate. In yet another embodiment, the layout pattern of the diffraction gratings can be written into a photosensitive layer disposed over the mask layer and/or the mold substrate.

In the case of direct writing the mask layer, the pattern may be transferred to a different layer of the multiple possible layers over the mold substrate. The mold substrate may be, but is not limited to, silicon or quartz, and the transfer process may be, for example, an ion etch process. In the case of the pattern being written into a photosensitive layer, the layout pattern could then be transferred to a mask layer underneath the photosensitive layer by means of, for example, either a dry or wet etch process. The layout pattern may also be transferred directly from the photosensitive layer to the mold substrate using, for example, an ion etch or a wet etch process.

The mold substrate which has received the layout pattern of the diffraction gratings may be utilized as a mold to produce another mold substrate, or be utilized as a mold to produce a diffraction grating pattern for an optical image light guide. The method of utilizing the mold substrate to produce image light guide diffraction grating patterns may include applying a polymer to the mold substrate to form the diffraction grating pattern in the polymer, and then adhering the polymer to a surface of an image light guide to form the diffraction grating pattern thereon. Other techniques known to those skilled in the art may also be used to replicate and transfer the diffraction patterns from the mold substrate to the image light guide.

As illustrated in FIG. 2, in an embodiment, the arrangement of diffraction gratings 24, 26, 28 may be used in the imaging light guide 20 of an augmented and/or virtual reality virtual image near-eye display system 34. The turning diffractive optic 26 may be used to expand the exit pupil of the near-eye display system along one direction, and the out-coupling diffractive optic 28 may be used to expand the exit pupil of the near-eye display system along another direction. In an embodiment, the turning diffractive optic 26 expands the exit pupil of the near-eye display system in a first direction and the out-coupling diffractive optic 28 expands the exit pupil of the near-eye display system in a second direction.

In an embodiment, the virtual image near-eye display system 34 may take the form of glasses to be worn by a person 32. At least one of the lenses of the glasses may comprise the imaging light guide 20. The virtual image near-eye display system 34 may include a projector 36 for generating image bearing light beams projected toward the image light guide in-coupling diffractive grating 24. A portion of the in-coupled image bearing light beam is directed from the in-coupling diffractive grating 24 to the turning diffractive optic 26 which turns at least a portion of the image bearing light beam toward the out-coupling diffractive optic 28, allowing the person 32 to view a virtual image. In another embodiment, the virtual image near-eye display system comprising the imaging light guide 20 may take the form of a face shield.

Figure 3:
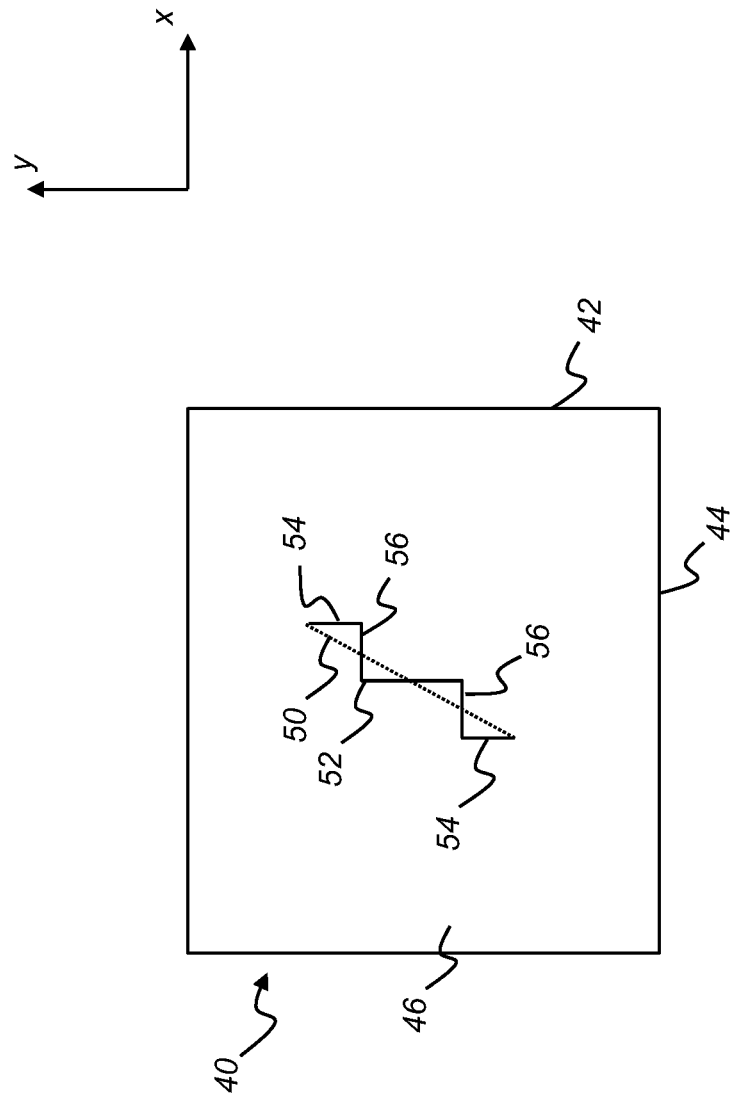
FIG. 3 illustrates a schematic of a substrate according to an embodiment of the present disclosure.

As illustrated in FIG. 3, in an embodiment, a mold substrate 40 may have a flat surface 46. Flat surface 46 may comprise a coating/layer that is not the same material as the mold substrate 40. In an embodiment, the mold substrate 40 may be quartz and the flat surface 46 may comprise a chrome layer. In another embodiment, the flat surface 46 may comprise a photosensitive coating. Further, the flat surface 46 may result from multi-layer coatings applied to the mold substrate 40.

Figure 10:
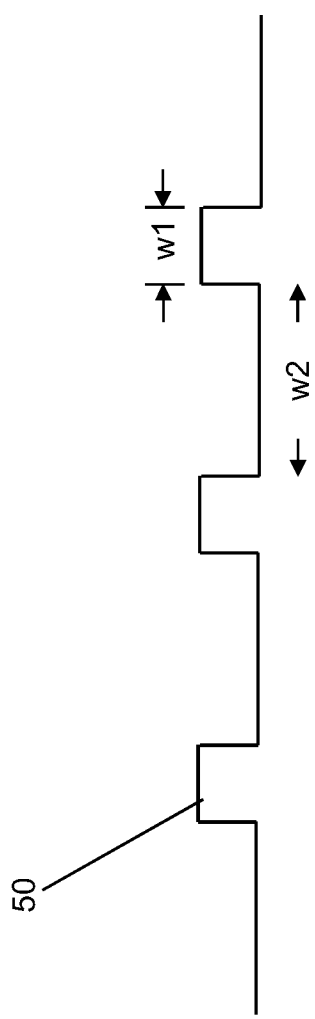
FIG. 10 illustrates a schematic of a diffraction grating duty cycle according to an embodiment of the present disclosure.

FIG. 3 shows a schematic of a portion of a diffraction grating 24, 26, 28 having a plurality of straight line diffractive features 50 (only one straight line diffractive feature 50 is illustrated in FIG. 3). In an embodiment, the diffractive features 50 may be fabricated by a beam writing machine (such as the beam writing system 200 described herein) on and/or in the substrate flat surface 46. Each diffractive feature 50 may be a groove of a desired depth and desired width. As illustrated in FIG. 10, in an embodiment, the duty cycle of the diffractive features 50 of each diffraction grating 24, 26, 28 may be less than 50%. In other words, the width w1 of the raised portion of the diffractive feature 50 is less than half the width w2 of the recessed portion of the diffractive feature 50. In another embodiment, only one of the diffraction gratings 24, 26, 28 may have a diffractive feature 50 duty cycle less than 50%; in this embodiment, the diffraction grating 24, 26, 28, having the diffractive feature 50 duty cycle less than 50% may be oriented such that the diffractive features 50 are parallel with a preferred write direction of the beam writing machine.

Mold substrate 40 may include one or more alignment features utilized to orient the mold substrate 40 relative to the beam writing machine. In an embodiment, the one or more alignment features may comprise a first straight edge 42 and a second straight edge 44. The first straight edge 42 may be aligned generally parallel with the beam writing machine's y-axis, and the second straight edge 44 may be aligned generally parallel with the beam writing machine's x-axis. In another embodiment, a mold substrate may have a non-straight perimeter. In an embodiment where the mold substrate includes a non-straight perimeter, the one or more alignment features may be, but are not limited to, one or more fiducial markers.

In an embodiment, the diffraction grating pattern may be fabricated in the mold substrate 40 and/or flat surface 46 through a combination of deflection of the write beam, selective powering and/or activation of the write beam, and/or translation of the mold substrate 40. As illustrated in FIG. 3, to approximate the desired straight line diffractive feature 50, the beam writing machine beam may take a step pattern 52, also referred to herein as a zigzag path. The beam writing machine step pattern 52 includes one or more y-axis writing paths 54, and one or more x-axis writing paths 56. In this way, the digital beam writing machine that has x- and y-axis beam path directions over the flat surface 46 can fabricate the desired straight line diffractive feature 50, disposed at an angle to the x- and y-axis, by approximating the straight line 50 utilizing the step pattern 52. For example, a mold substrate 40 may comprise in-coupling, turning, and out-coupling diffractive optics 24, 26, 28 wherein one or more of the diffractive optics 24, 26, 28 comprise stepped line diffractive features 52 which generally behave like straight line diffractive features 50. In other words, the diffractive features of one or more of the diffractive optics 24, 26, 28 comprise stepped line diffractive features 52 operable to diffract incident light as if they were straight line diffractive features 50.

In another embodiment, the desired diffractive features may be written using an x-y raster generated through a combination of deflection of the write beam, translation of the mold substrate 40, and/or selective powering of the write beam. With the raster approach, straight line diffractive features 50 that are disposed at an angle with respect to the x- and y-axis will also have a step pattern. The raster may include multiple pass writing to generate the complete set of desired diffractive features.

In practice, the written step pattern 52 on the final substrate and/or parallel plate waveguide may be much smoother than the path or raster of the write beam. Smoothing occurs from both the finite width of the write beam and chemical processing used to form the final substrate. The resulting step pattern may require precise techniques such as scanning electron microscopy (SEM) or atomic force microscopy (AFM) to be seen. In certain cases where the step pattern 52 is present but relatively smooth, it may be challenging to see even with these microscopy techniques.

In another embodiment (not shown) the mold substrate 40 may be rotated such that the straight edge 42 and/or straight edge 44 is not aligned parallel to the y- and/or x-axis, respectively. In this embodiment, alignment features such as fiducial marks may be utilized to align the mold substrate 40 within the beam writing machine.

Figure 4A:
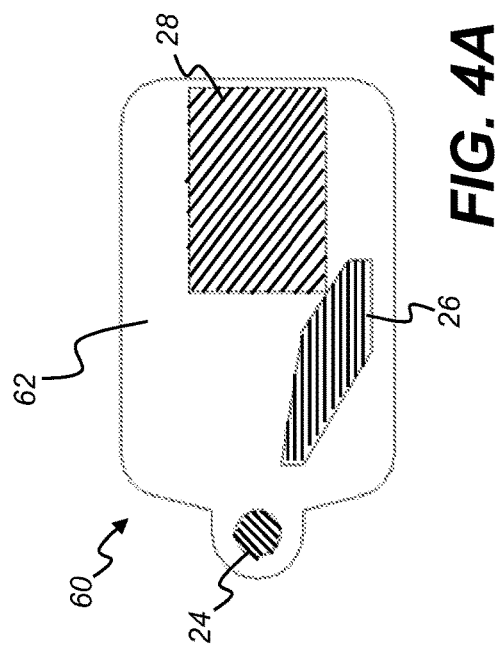
FIG. 4A illustrates a schematic of a waveguide having three diffraction gratings according to an embodiment of the present disclosure.
Figure 4B:
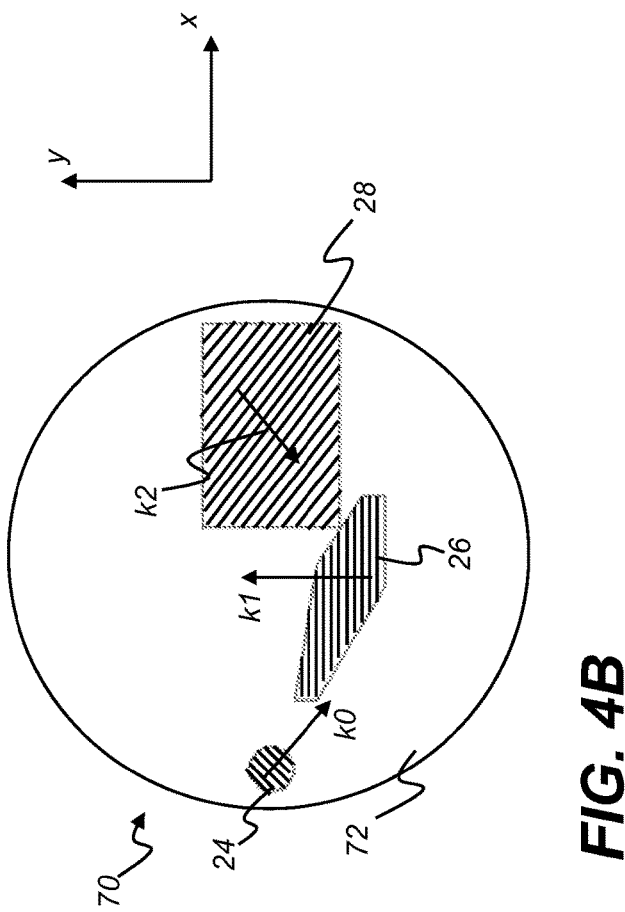
FIG. 4B illustrates a schematic of a substrate depicting an orientation of a turning diffractive optic according to an embodiment of the present disclosure.

As illustrated in FIG. 4A, in an embodiment, a parallel plate waveguide 60 may include the in-coupling diffractive grating 24, turning diffractive optic 26, and out-coupling diffractive optic 28 on one or more surfaces 62 thereof. As illustrated in FIG. 4B, a mold substrate 70 may include a surface 72 having the diffraction grating pattern 24, 26, 28 of the parallel plate waveguide 60. The surface 72 of mold substrate 70 may comprise a different material than the mold substrate 70. In an embodiment, the mold substrate 70 may be quartz and the surface 72 may be a chrome coating and/or multi-layer coating. As illustrated in FIG. 4B, the grating vector k1 of turning diffractive optic 26 is oriented to be parallel to the y-axis direction of the beam writing machine. The grating vector k1 is perpendicular to the straight line diffractive features of the turning diffractive optic 26. In other words, the grating vector k1 is oriented perpendicular to the x-axis of the beam writing machine. The in-coupling diffractive grating 24 has a grating vector k0, and the out-coupling diffractive optic 28 has a grating vector k2. In an embodiment, grating vector k0 may make an angle of approximately 65 degrees with respect to the grating vector k1, and grating vector k2 may be mirrored over a line of symmetry with the grating vector k0 to make an angle of approximately 65 degrees with respect to the turning diffractive optic vector k1. The sum of the three diffraction grating vectors k0, k1, k2 is approximately zero. The grating vectors k0 and k2 have lengths such that together with the grating vector k1, when placed tip to tail of the representative arrows, forms an isosceles triangle. In other words, a force vector diagram of the grating vectors k0, k1, k2 forms a triangle. In an embodiment, it may be the case that the three grating vectors k0, k1, k2 form a scalene triangle.

In another embodiment, the layout of the diffraction gratings 24, 26, 28 on the mold substrate surface 72 may be rotated such that the grating vector k1 is oriented to be parallel with the beam writing machine's x-axis. Thus, the straight line diffractive features of turning diffractive optic 26 are parallel to the y-axis direction.

On the mold substrate 70, the grating vector k1 of the turning diffractive optic 26 is to be aligned perpendicular to one of the beam writing machine's preferred writing directions that is labeled the x- and y-axis directions. This enables the shape of the perimeter of the mold substrate 70 to be of any convenient shape including, but not limited to, circular, square, rectangular, or elliptical.

Orienting the grating vector k1 of the turning diffractive optic 26 perpendicular to one of the beam writing machine's preferred writing directions significantly decreases the time required to write the diffraction gratings 24, 26, 28 into/onto the mold substrate 70. For example, a first mold substrate may have a diffraction grating pattern oriented such that grating vector k1 is perpendicular to one preferred write direction and parallel to the other preferred write direction. A second mold substrate may have a diffraction grating pattern identical to the diffraction grating pattern of the first mold substrate, except that the grating vector k1 is not oriented perpendicular to one of the preferred write directions. The relative orientations of grating vectors k0, k1, and k2 with respect to each other is the same for both the first and second substrates, and the overall size of in-coupling diffractive grating 24, turning diffractive optic 26, and out-coupling diffractive optic 28 are also the same. In this example, diffraction grating vectors k0 and k2 are disposed at an angle of 65 degrees with respect to the grating vector k1 across a line of symmetry, the total write area for all three diffraction gratings 24, 26, 28 is approximately 574 mm$^2$, and the diffraction grating pitch of all three diffraction gratings 24, 26, 28 is between 320 nm and 380 nm. For the second mold substrate, with none of the three diffraction grating vectors k0, k1 and k2 in alignment with either the x- or y-axis preferred writing directions of the beam writing machine, the write time is approximately 884 minutes (as determined from testing). For the first mold substrate, with the turning diffractive optic vector k1 aligned parallel with the y-axis, so that the straight line diffractive features of the turning diffractive optic 26 are parallel to the x-axis of the beam writing machine, and the straight line diffractive features associated with the grating vectors k0 and k2 are not in a preferred write direction, the total write time for all three diffraction gratings 24, 26, 28 is 527 minutes (as determined from testing). Thus, the write time for the first mold substrate is 40% less than the write time of the second mold substrate.

FIG. 5A is an illustration showing the layout of three diffraction gratings 84, 86, 88, on one or more surfaces 82 of a parallel plate waveguide 80. The pitch of the diffraction gratings 84, 86, 88 may be between 300 nm and 1000 nm.

FIG. 5B is an illustration of the diffraction grating layout of FIG. 5A on a flat surface 92 of a mold substrate 90 showing the orientation of the diffraction gratings 84, 86, 88. The flat surface 92 of the mold substrate 90 may comprise multi-layered coatings, e.g., a chrome coating and/or a photopolymer coating, for example PMMA or other photoresist material. The grating vector k1 of the diffraction grating 86 is orientated to be perpendicular to the x-axis direction of the beam writing machine. The diffraction grating 84 has a grating vector k0, and the diffraction grating 88 has a diffraction grating vector k2. Grating vector k0 may make an angle of approximately 60 degrees with respect to the grating vector k1. Grating vector k2 of diffraction grating 88 may make an angle of approximately 60 degrees with respect to the diffraction grating vector k1 mirrored across a line of symmetry. The sum of the three diffraction grating vectors sums to approximately zero. The grating vectors k0 and k2 may have lengths such that together with the grating vector k1, when placed tip to tail of the representative arrows, forms an isosceles triangle. In another embodiment, the grating vectors k0, k1 and k2 may form a scalene triangle.

In an embodiment, the total write area for all three diffraction gratings 84, 86, 88 may be approximately 200 mm$^2$. In another embodiment, the total write area for all three diffraction gratings 84, 86, 88 may be approximately an entire surface 92 of the mold substrate 90.

Figure 6:
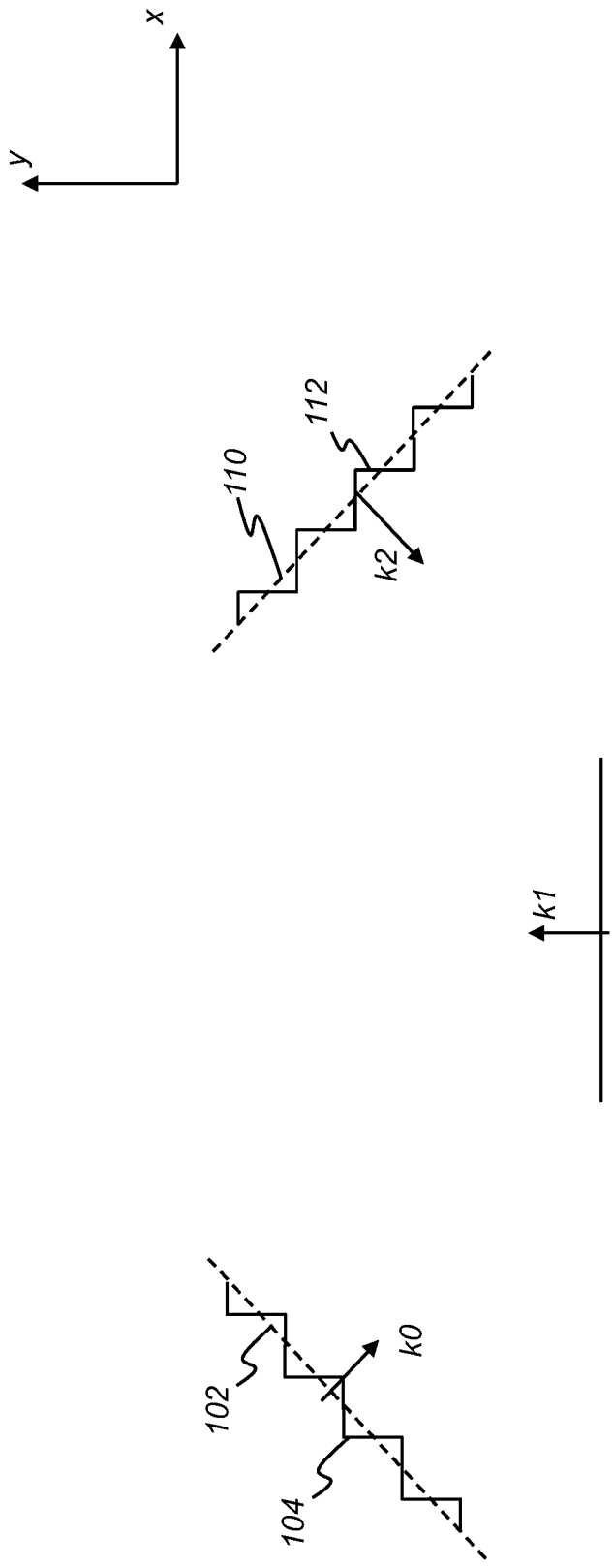
FIG. 6 illustrates a schematic of the orientation of diffraction grating vectors according to an embodiment of the present disclosure.

FIG. 6 illustrates an input diffraction grating vector k0, a turning diffraction grating vector k1, and an output diffraction grating vector k2. A straight line diffractive feature 102 of the input diffraction grating vector k0 is produced via the associated beam writing path 104, and a straight line diffractive feature 110 of the diffraction grating vector k2 is produced via the associated beam writing path 112. The grating vectors k0 and k2 may be symmetric across a line of symmetry. Turning diffraction grating vector k1 may be positioned optically between the diffraction grating represented by grating vector k0 and the diffraction grating represented by the diffraction grating vector k2.

Figure 7:
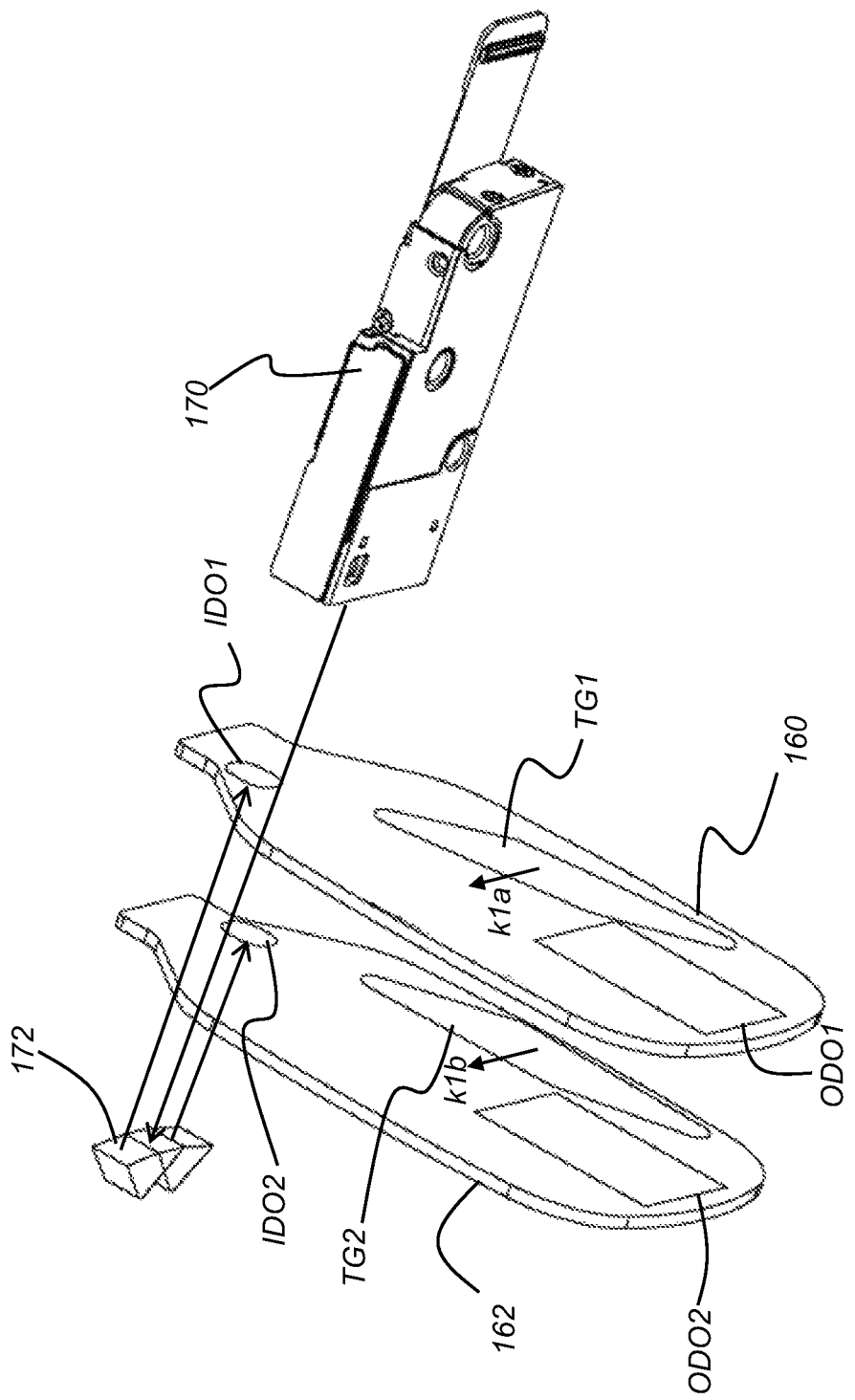
FIG. 7 illustrates a schematic of two parallel plate planar waveguides according to an embodiment of the present disclosure.

FIG. 7 is an illustration of the stacking of two parallel plate planar waveguides 160, 162 produced, at least in part, utilizing the mold substrates 70. The first parallel plate planar waveguide 160 comprises at least an input coupling diffraction grating IDO1, a turning diffraction grating TG1, and an output coupling diffraction grating ODO1. The grating vector k1a is the diffraction grating vector associated with turning diffractive optic TG1. Turning diffractive optic TG1 is positioned optically between the input coupling diffraction grating IDO1 and the output coupling diffraction grating ODO1. The second parallel plate planar waveguide 162 comprises at least an input coupling diffraction grating IDO2, a turning diffraction grating TG2, and an output coupling diffraction grating ODO2. The grating vector k1b is the diffraction grating vector associated with turning diffractive optic TG2. Turning diffractive optic TG2 is positioned optically between the input coupling diffraction grating IDO2 and the output coupling diffraction grating ODO2.

During production of the mold substrate 70, if the angle between the turning diffractive optic TG1/TG2 straight line diffractive features and the x- or y-axis of the beam writing machine approaches zero degrees without being parallel, the input and out-coupling diffractive optic straight line diffractive feature step pattern produced by the beam writing machine can induce an effective angular error in the diffracted light from the out-coupling diffractive optic ODO1/ODO2. Thus, the input and output angles of a ray of an image bearing light beam will not be the same. This effective angular error may cause the stacked plates of the parallel plate planar waveguides 160, 162, to have either their direct images offset from each other or have Fresnel reflections that are offset from the image. However, if there is no effective angular error in the fabricated straight line diffractive features, parallel plate planar waveguides 160, 162 align the Fresnel reflections with the desired image light, thereby improving the output image quality.

In digital beam writing production of the mold substrate 70, straight line diffractive features that are not parallel to the beam writing machines' x- and/or y-axis are produced in a zigzag or step pattern as described above. In an embodiment, orienting the turning diffractive optic 26 straight line diffractive features parallel with a first preferred write direction orients the angle of the in-coupling diffractive grating 24 and out-coupling diffractive optic 28 straight line diffractive features to a second preferred write direction such that the angles are mirrored across a line of symmetry. Orienting the mold substrate 70 in this way during the beam writing process produces symmetric step patterns of the in-coupling diffractive grating 24, and out-coupling diffractive optic 28 straight line diffractive feature step patterns, thereby eliminating the effect of periodic error in the step pattern. In an embodiment, the straight line diffractive features of the turning diffractive optic 26 are oriented within 1 arc minute of parallel with one of the preferred write directions. In another embodiment, the straight line diffractive features of the turning diffractive optic 26 are oriented within 1 arc second of parallel with one of the preferred write directions.

Orienting the turning diffractive optic 26 straight line diffractive features parallel with a first preferred write direction of the beam writing machine, and mirroring the angles of the grating vectors k0, k2 (see FIG. 6) eliminates, or cancels the effect of, periodic errors in the straight line diffractive feature step pattern of the mold substrate 70.

Parallel plate planar waveguides 160, 162 are aligned in the stacking thereof such that the grating vector k1b is parallel to the grating vector k1a. FIG. 7 further illustrates an example of a micro projector 170 that produces image bearing light that is redirected by prism assembly 172 such that the image bearing light is directed to the input coupling diffraction gratings IDO1 and IDO2.

In another embodiment, the grating vectors k0 and k2 may not be mirrored over a line of symmetry. However, orienting the grating vector k1 perpendicular to a preferred write direction of the beam writing machine may still at least partially eliminate the effect of periodic errors in the associated straight line diffractive features caused by the step pattern of the digital beam writing machine. The effect of periodic errors may be at least partially eliminated because periodic errors produced by the step pattern will be the same for both diffraction gratings and may at least partially align across a line of symmetry.

Figure 9:
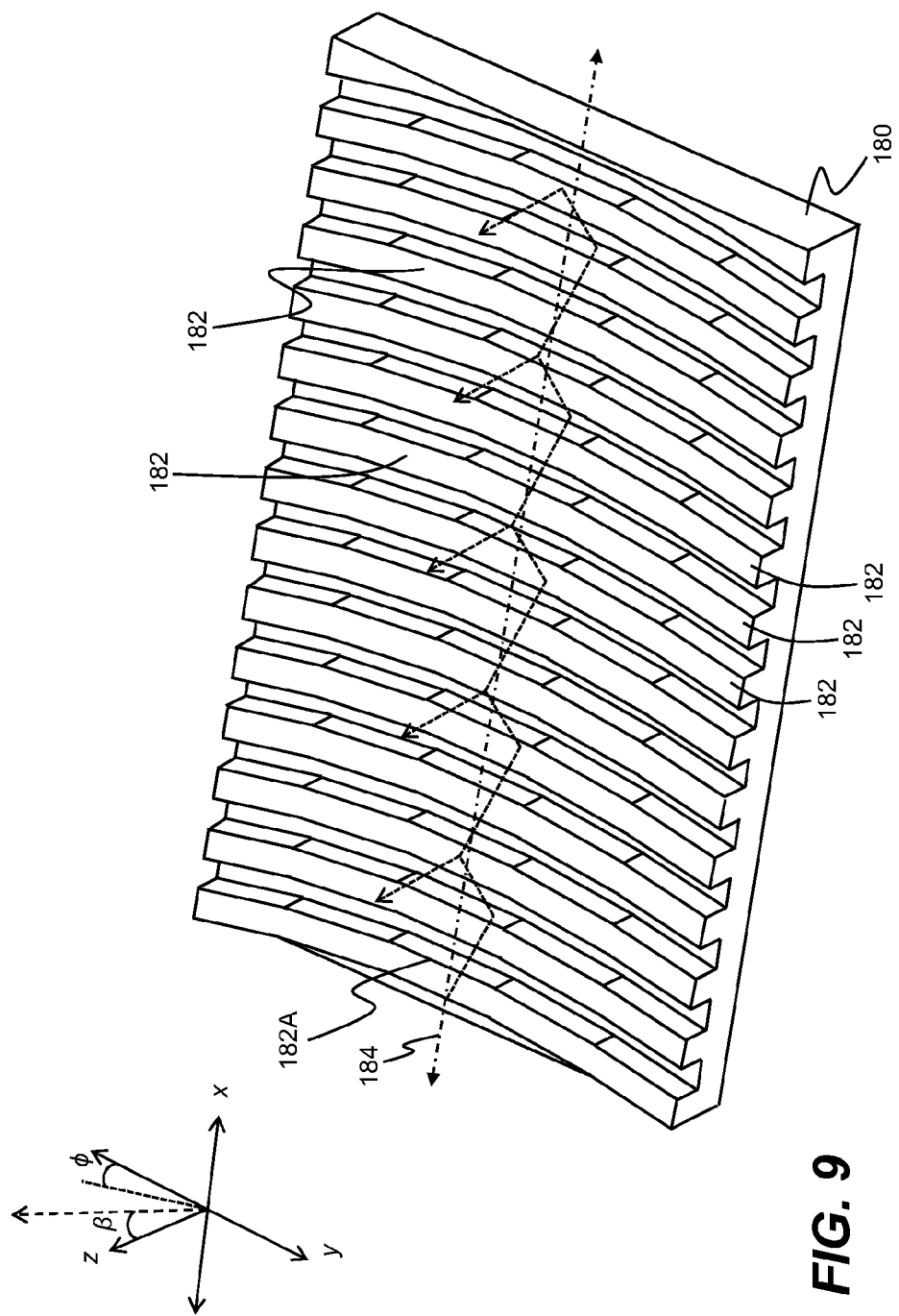
FIG. 9 illustrates a schematic of a substrate according to an embodiment of the present disclosure.

In an embodiment, as illustrated in FIG. 9, a diffraction grating 180 may include straight line diffractive features 182 forming contiguous chordal segments of a curve. Measured against the y-axis, the angle φ of the straight line diffractive features 182 varies in a stepwise fashion along the y-axis as chords of a continuous curve. The straight line diffractive features 182 angularly depart from the y-axis orientation in a stepwise fashion with distance from a centerline 184 of the diffraction grating 180 along the x-axis, but the angular departures change in sign on opposite sides of the centerline 184. In an embodiment, to reduce or eliminate periodic errors produced by the step pattern of the beam writing machine, the straight line diffractive feature 182A disposed across the centerline 184 may be oriented parallel with a preferred beam writing direction. This alignment mirrors the straight line diffractive features 182 of the diffraction grating 180 across the centerline 184.

Figure 11:
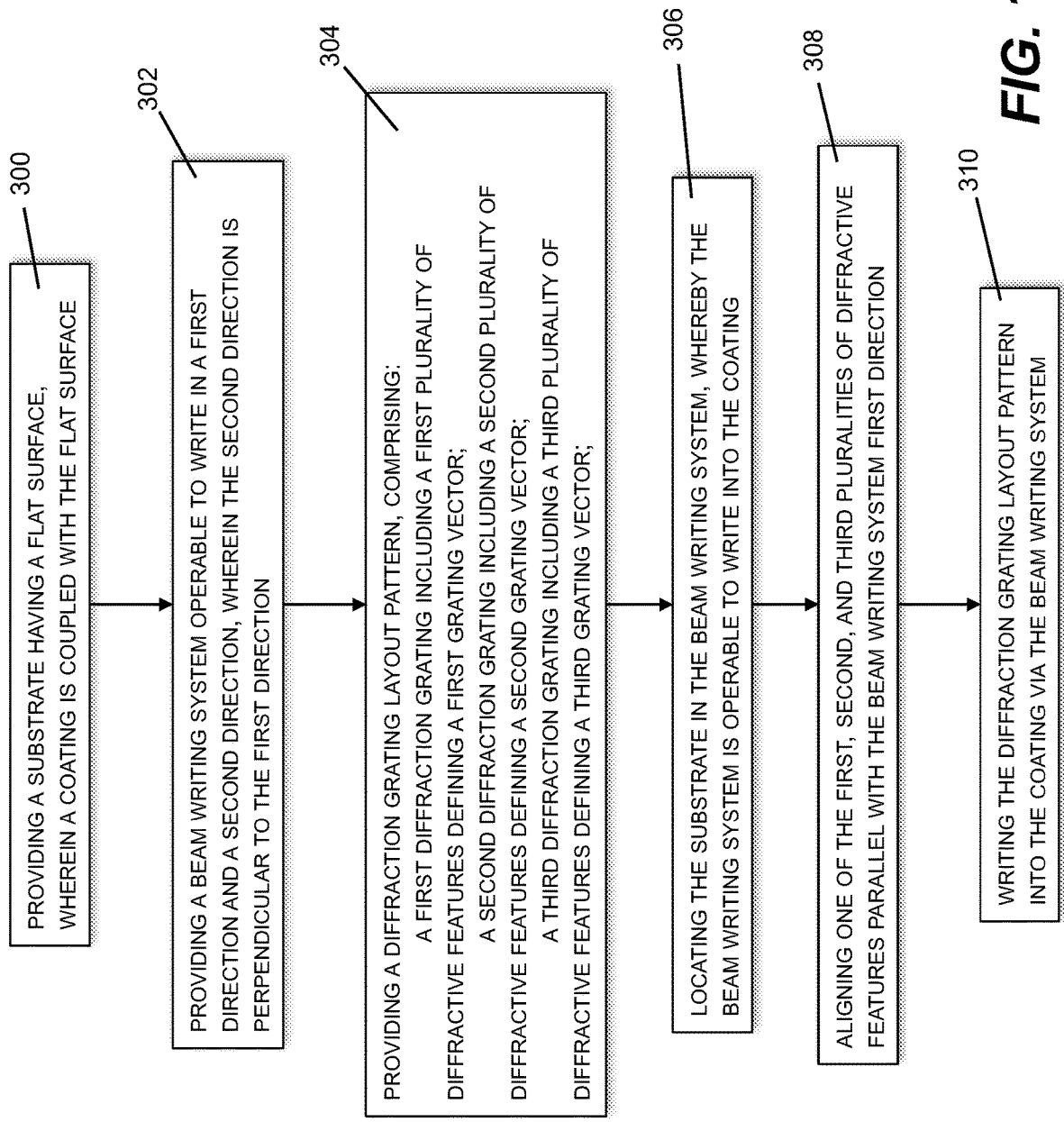
FIG. 11 is a flowchart illustrating a method of fabricating a mold substrate according to an embodiment of the present disclosure.

Reference is now made to FIG. 11 depicting a simplified block diagram in accordance with an embodiment of a method of providing a mold substrate. The method includes a step 300 providing a substrate having a flat surface, wherein a coating is coupled with the flat surface. The method includes a step 302 providing a beam writing system operable to write in a first direction and a second direction, wherein the second direction is perpendicular to the first direction. The method also includes a step 304 providing a diffraction grating layout pattern having a first diffraction grating including a first plurality of diffractive features defining a first grating vector, a second diffraction grating including a second plurality of diffractive features defining a second grating vector, and a third diffraction grating including a third plurality of diffractive features defining a third grating vector. The method further includes a step 306 locating the substrate in the beam writing system, whereby the beam writing system is operable to write into the coating. Additionally, the method includes a step 308 aligning one of the first, second, and third pluralities of diffractive features parallel with the beam writing system first direction. The method includes a step 310 writing the diffraction grating layout pattern into the coating via the beam writing system.

Reference is now made to FIG. 12 depicting a simplified block diagram in accordance with an embodiment of a method of providing a mold substrate. In the embodiment illustrated in FIG. 12, the step 308 aligning one of the first, second and third pluralities of diffractive features parallel with the beam writing system first direction includes a step 308A wherein the first and second pluralities of diffractive features are not aligned parallel with one of the beam writing system first and second directions. The step 310 writing the diffraction grating layout pattern into the coating via the beam writing system includes a step 310A writing the first and second pluralities of diffractive features into the coating in a stepped pattern. Further, the step 310 includes a step 310B wherein the first and second diffraction gratings are disposed in bilateral symmetric orientation about the second diffraction grating, whereby an angular error induced by the stepped pattern is at least partially corrected.

Figure 8:
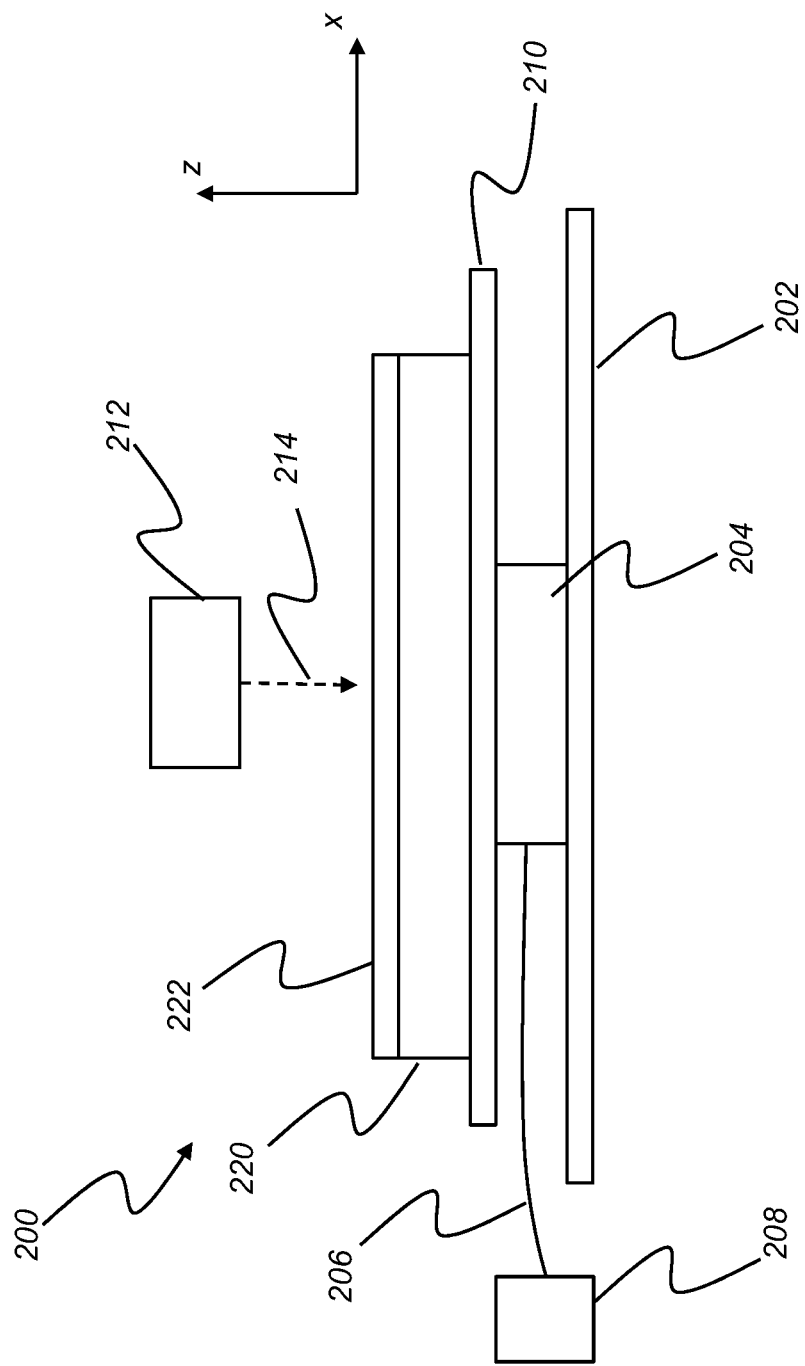
FIG. 8 illustrates a schematic of a beam writing machine having a rotary stage according to an embodiment of the present disclosure.

As illustrated in FIG. 8, in an embodiment, a beam writing system 200 may include at least an xy-linear translation platform 202, a rotation means 204, a rotation means controller 208, and communication means 206. The communication means 206 enables the controller 208 to send signals to the rotation means 204. In an embodiment, the communication means 206 may be a wire cable having multiple electrically independent wires, such as, but not limited to, a coaxial cable or an 8-channel cable. In another embodiment, the controller 208 may communicate with the rotation means 204 via wireless signal transmission such as, for example, wireless local area networking or wireless personal area networking.

In an embodiment, the rotation means 204 may be a motorized rotary stage. In an embodiment, the angular accuracy of the rotation means 204 may be better than 0.01 degrees. In another embodiment, the angular accuracy of the rotation means 204 may be better than 0.001 degrees. The beam writing system 200 may further include a rotation platform 210 mounted to the rotation means 204 for rotation therewith. The beam writing system 200 may also include a beam source 212 for generating and emitting beam 214. The beam source 212 may also comprise means (not shown) for focusing and/or steering emitting beam 214. In an embodiment, one or more magnetic lenses may be utilized to focus and/or steer emitting beam 214. In another embodiment, the emitting beam 214 may be focused and/or steered via electrostatic deflection. Other components of the beam writing system 200, e.g., a vacuum chamber, are well known to those skilled in the relevant arts and are not illustrated herein.

In operation of the beam writing system 200, a mold substrate 220 with an optional flat surface coating 222 is placed onto the rotation platform 210. Diffraction gratings may be fabricated onto or into the mold substrate 220 or into a flat surface coating 222. The mold substrate 220 can be rotated to preferred orientations by the rotation means 204. In this way, the straight line diffractive features of all diffraction gratings can be orientated in the preferred write direction that is associated with the linear translation directions of the xy-linear translation platform 202 and/or preferred beam steering directions at the time of fabrication in the beam writing system 200.

In addition to orienting the straight line diffractive features to be in the preferred straight line write directions, beam writing system 200 may be utilized to write curved features onto or into mold substrate 220 and/or optional flat surface coating 222 by operating the rotation means 204 during linear translation of the xy-linear translation platform 202.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

The invention claimed is:

1. A beam writing system, comprising:
a first platform operable to translate in an x-axis direction and a y-axis direction; and
a second platform operable to rotate about a z-axis perpendicular to said first platform, wherein said second platform is mounted to said first platform;
wherein a substrate may be selectively coupled with said second platform whereby a diffractive feature is always oriented in one of said first platform x-axis and y-axis directions during fabrication,
wherein said beam writing system is configured to write a diffraction pattern layout into a coating of said substrate,
wherein said diffraction pattern layout comprises a first plurality of diffractive features and a second plurality of diffractive features, and
wherein at least one of said first and second pluralities of diffractive features comprise diffractive features having a stepped pattern operable to diffract incident light as if said stepped pattern diffractive features were linear diffractive features.

2. The beam writing system according to claim 1, wherein said beam writing system is an electron beam lithography system.

3. The beam writing system according to claim 1, wherein said beam writing system is a laser lithography system.

4. A method of fabricating a substrate, comprising:
providing a substrate having a planar surface comprising a coating;
providing a beam writing system operable to write in a first direction and a second direction, wherein said second direction is perpendicular to said first direction;
providing a diffraction pattern layout, comprising:
a first plurality of linear diffractive features, and
a second plurality of linear diffractive features,
locating said substrate in said beam writing system, wherein said beam writing system is operable to write into said coating;
aligning one of said first and second pluralities of linear diffractive features parallel with said beam writing system first direction; and
writing said diffraction pattern layout into said coating;
wherein at least one of said first and second pluralities of diffractive features comprise diffractive features having a stepped pattern operable to diffract incident light as if said stepped pattern diffractive features were linear diffractive features.

5. The method of fabricating a substrate according to claim 4, wherein one of said first and second pluralities of diffractive features is not aligned parallel with either of said beam writing system first and second directions.

6. The method of fabricating a substrate according to claim 4, wherein said second plurality of linear diffractive features comprises a greater total area than said first plurality of linear diffractive features, and wherein said diffraction pattern layout is oriented such that said second plurality of linear diffractive features is aligned parallel with said beam writing system first direction.

7. The method of fabricating a substrate according to claim 6, wherein said second plurality of linear diffractive features comprises a diffractive feature duty cycle less than 50%.

8. The method of fabricating a substrate according to claim 4, wherein a duty cycle of said diffractive features of at least one of said first and second plurality of linear diffractive features is less than 50%.

9. The method of fabricating a substrate according to claim 4, wherein said plurality of diffractive features aligned parallel with said beam writing system first direction are oriented within 1 arc minute of parallel with said beam writing system first direction.

10. The method of fabricating a substrate according to claim 4, wherein said plurality of diffractive features aligned parallel with said beam writing system first direction are oriented within 1 arc second of parallel with said beam writing system first direction.

11. The method of fabricating a substrate according to claim 4, wherein said diffraction pattern layout further comprises a third plurality of linear diffractive features,
said first plurality of linear diffractive features forming an in-coupling diffraction grating,
said second plurality of linear diffractive features forming a turning diffractive optic arranged optically between said first plurality of linear diffractive features and said third plurality of linear diffractive features,
said third plurality of linear diffractive features forming an out-coupling diffractive optic,
wherein said second plurality of linear diffractive features is aligned parallel with said beam writing system first direction.

12. The method of fabricating a substrate according to claim 11, wherein:
said first and third pluralities of linear diffractive features are not aligned parallel with one of said beam writing system first and second directions;
said first and third pluralities of linear diffractive features comprise diffractive features having a stepped pattern forming substantially linear diffractive features; and
said first and third pluralities of linear diffractive features are disposed in bilateral symmetric orientation about said second plurality of linear diffractive features.

13. The method of fabricating a substrate according to claim 12, wherein said first and third pluralities of linear diffractive features are written into said coating as stepped line diffractive features, the method further comprising molding a waveguide operable to propagate image-bearing light via total internal reflection, wherein an angular error induced in image-bearing light diffracted by said stepped line diffractive features is corrected via said bilateral symmetric orientation.

14. The method of fabricating a substrate according to claim 11, wherein said first plurality of linear diffractive features defines a first grating vector, said second plurality of linear diffractive features defines a second grating vector, and said third plurality of linear diffractive features defines a third grating vector, wherein a vector sum of said first, second, and third grating vectors is approximately zero.

15. The method of fabricating a substrate according to claim 4, further comprising molding a waveguide utilizing said substrate.

16. The method of fabricating a substrate according to claim 4, wherein said substrate is a waveguide for a virtual image near-eye display system.

17. The method of fabricating a substrate according to claim 4, wherein said stepped pattern comprises a first write path direction and a second write path direction, consecutive portions of said first write path direction and said second write path direction forming said stepped pattern.

18. The method of fabricating a substrate according to claim 4, wherein said diffraction pattern layout further comprises a third plurality of linear diffractive features, and wherein said first, second, and third plurality of linear diffractive features form contiguous chordal segments of a curve.

* * * * *